United States Patent [19]

Huko

[11] Patent Number: 4,757,896
[45] Date of Patent: Jul. 19, 1988

[54] CASSETTE TAPE CASE

[76] Inventor: Chen Y. Huko, No. 78, Lane 42, Sec. 1, Nei Hu Road, Taipei, Taiwan

[21] Appl. No.: 99,404

[22] Filed: Sep. 22, 1987

[51] Int. Cl.⁴ .......................................... B65D 85/672
[52] U.S. Cl. .................................. 206/387; 206/509
[58] Field of Search ............................... 206/509, 387

[56] References Cited

FOREIGN PATENT DOCUMENTS 2928267  1/1981  Fed. Rep. of Germany ...... 206/387

Primary Examiner—William Price
Attorney, Agent, or Firm—Bacon & Thomas

[57] ABSTRACT

A cassette tape case comprising a top case housing and a bottom case housing wherein two bladed rollers are detachably mounted on the bottom case housing and two apertures correspond to the bladed rollers are provided on the top case housing. The bladed rollers are detachable from the bottom case housing and inserted into the apertures provided on the top case housing of a cassette case and combined with the bottom case housing of another cassette case to form a unit therewith.

1 Claim, 6 Drawing Sheets

CASSETTE TAPE CASE

BACKGROUND OF THE INVENTION

This invention relates to a cassette tape case which enables the combining of plurality such cases so as to form a unit therefrom. More particularly, the invention relates to such a case which is especially adapted to be joined with another case and assembled together.

In most homes, cassette tapes provide a means for relaxing. In fact, for music lovers, cassette tapes are considered to be indispensable. Due to the usual large number of cassette tapes in a collection there exists a need for an easy and effective way to store the tapes in an orderly manner.

In conventional method, a cassette tray, a minicupboard or a box is employed to store or keep cassette tapes. However, extra expense will incur to obtain these containers, and moreover these containers are usually limited to a certain number of tapes, say, 50 or 60 pieces of cassette tapes for a container. As a result, more containers are needed which therefore require greater space for their installation.

SUMMARY OF THE INVENTION

Accordingly, it is an object of this invention to provide a cassette tape case which will alleviate the above-mentioned drawbacks.

It is an object of this invention to provide a cassette tape case which is durable and inexpensive to manufacture.

Another object of this invention is to provide a cassette tape case which can be combined with another cassette tape case or more tape cases to form a unit.

Another object of the present invention is to provide a cassette tape case with bladed rollers such that the rollers can be detached from the case.

The attainment of the foregoing and related objects, advantages and features of the invention should be readily apparent after review of the folowing more detailed description of the invention, taken together with drawings, in which:

DETAILED DESCRIPTION OF THE INVENTION

Figure 1:
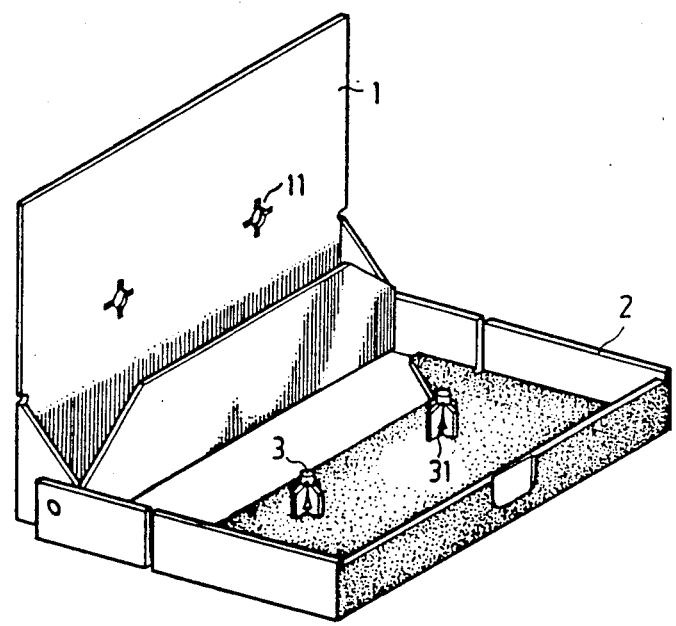
FIG. 1 is a perspective view of a cassette tape case with detachable bladed rollers in accordance with the invention.

Turning now to the drawings, more particularly to FIG. 1 and FIG. 2, there is shown a cassette tape case. As shown, the preferred embodiment includes a top case housing 1, a bottom case housing 2, two bladed rollers 3 which are detachably mounted to said bottom case housing 2. The apertures 11 having the shape corresponding to the shape of said bladed rollers 3 are provided on the surface of top case housing 1, said apertures being a circular hole with four slots joining the circular hole.

Figure 2A:
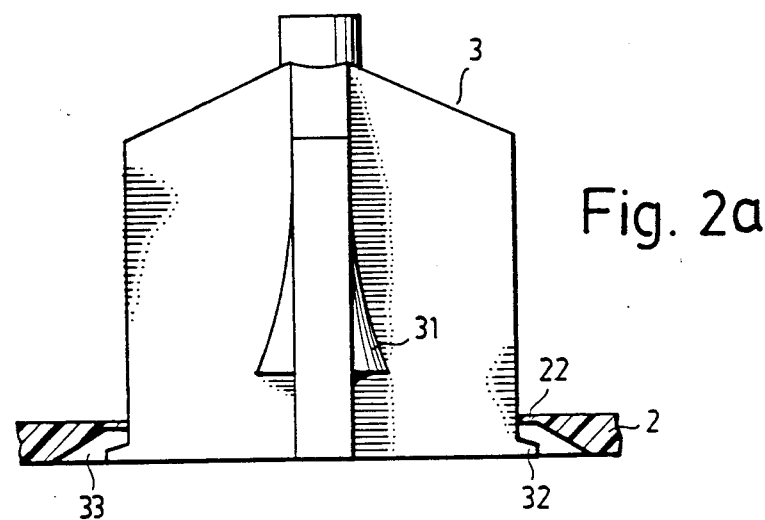
FIG. 2(a) illustrates a bladed roller attached to a bottom case housing in accordance with the invention.
Figure 2B:
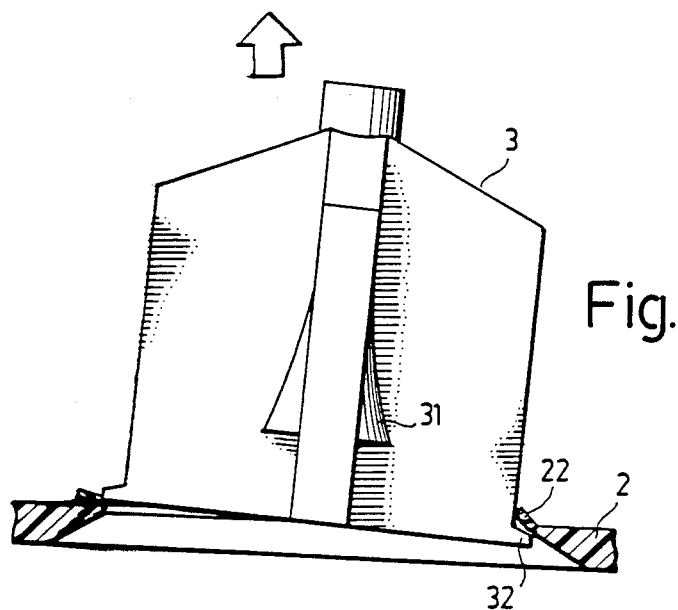
FIG. 2(b) illustrates the detachment of a bladed roller from a bottom case housing in accordance with the invention.
Figure 3:
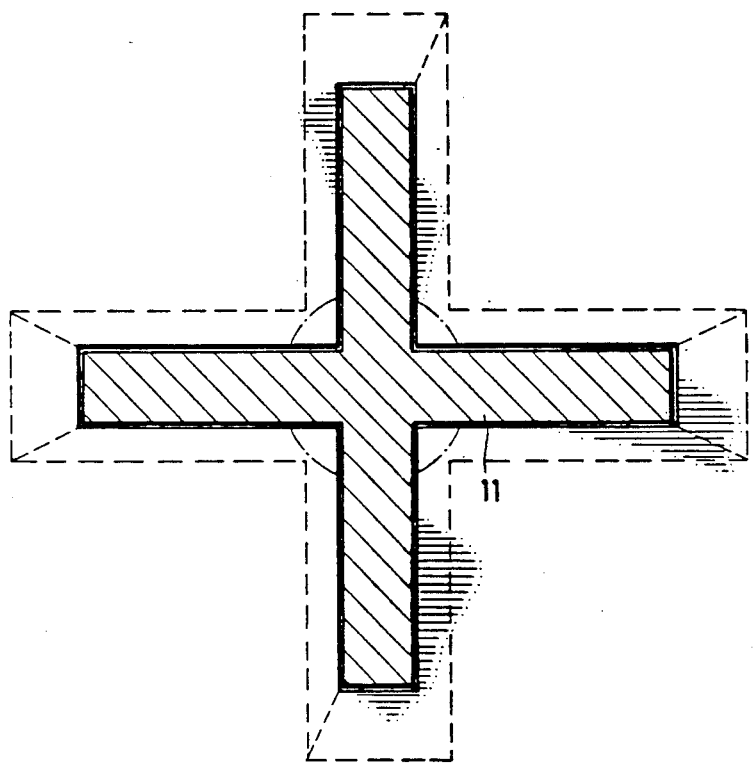
FIG. 3 is a schematic view of a cross-shaped slot on a top case housing in accordance with the invention.

FIG. 2(a) shows a bladed roller 3 detachably mounted on said bottom case housing 2. The bladed roller 3 is of conventional prior art which can be seen in well known cassette tape case. Therefore, further description of such a bladed roller is not necessary. However, said bladed roller 3 is detachable from said bottom case housing 2, and includes engaging elements 31 having a tapering shaped and provided on said bladed roller 3, with said engaging elements 31 being spaced from the base of bladed roller 3. At the base of the bladed roller 3, protruded elements 32 are provided. In the bottom case housing 2, a recess 33 for said bladed roller 3 is provided with ribs 22, which are breakable when the bladed roller 3 is detached with force from said bottom case housing 2 as shown in FIG. 2(b).

Figure 4:
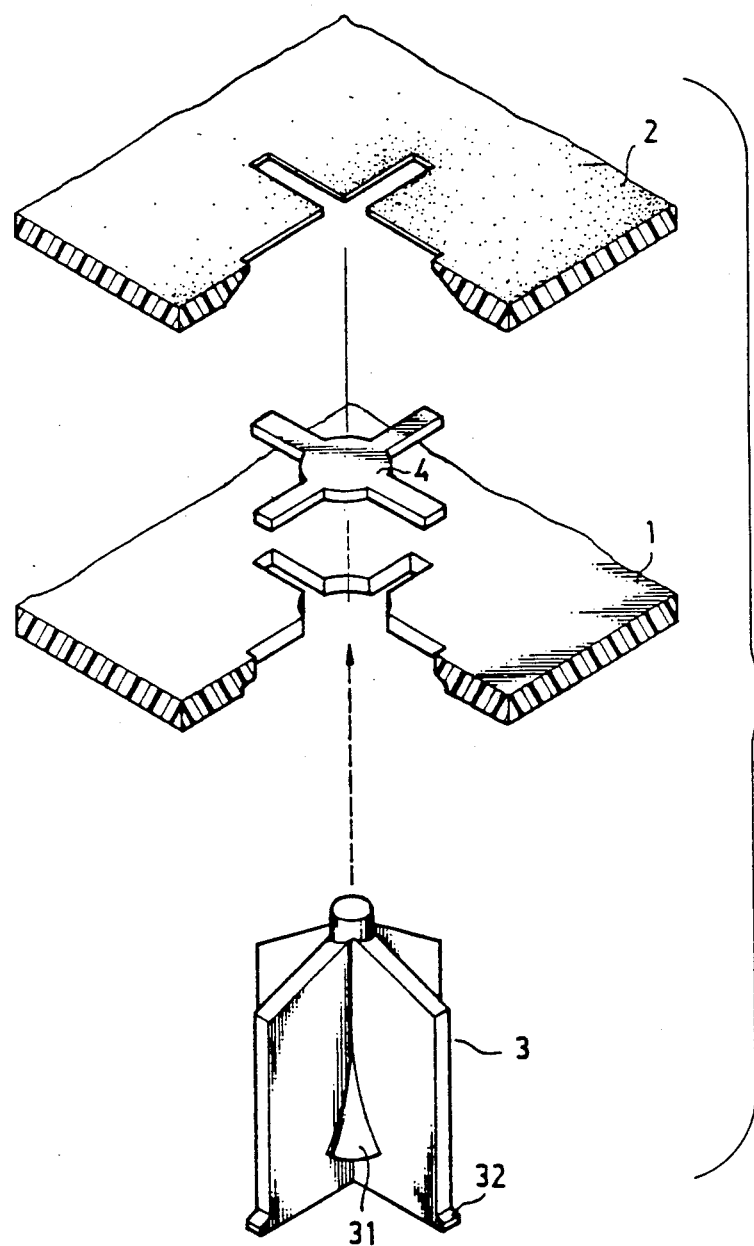
FIG. 4 is a partial fragmentary perspective view illustrating the combination of a top case housing of a cassette case and a bottom case housing of another cassette case with a bladed roller in accordance with the invention.

Referring to FIG. 4, a covering member 4 corresponding to the shape of the aperture 11 in the surface of top case housing 1 is disposed in aperture 11 of the top case housing 1.

Figure 6:
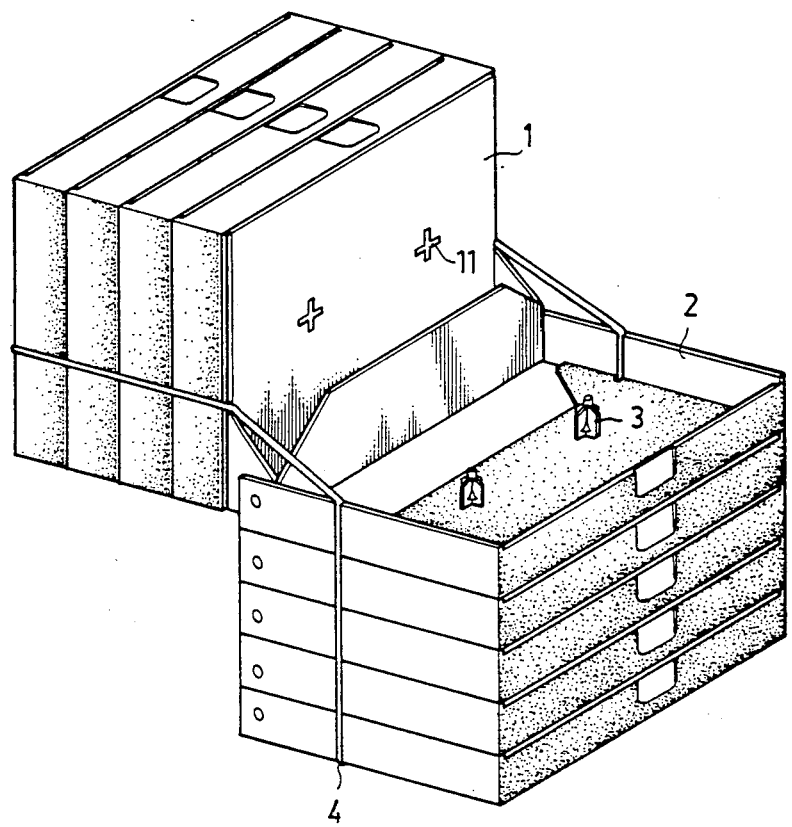
FIG. 6 is a perspective view showing a unit formed from the combination of cassette cases with bladed rollers in accordance with the present invention.

In accordance with the present invention, the cassette tape case is completed as shown in FIG. 1. When in combination, said bladed rollers 3 on said bottom case housing 2 are detached with force (as shown in FIG. 2(b)), thus, the ribs 22 of said bottom case housing 2 are broken away by means of said protruded elements 32 of said bladed roller 3. The covering member 4, as shown in FIG. 4, is removed and said bladed roller 3 is inserted through said aperture 11 on the top case housing 1 and in turn, said roller 3 passes through the bottom case housing 1 of another cassette tape case. Therefore, a plurality of cassette tape cases can be combined to form a unit as shown in FIG. 6. Due to the engaging elements 31 on said bladed roller 3, when the bottom case housing 2 of a cassette tape case is combined with the top case housing of another cassette tape case by means of said bladed roller 3, there is no possibility of disengagement.

Figure 5:
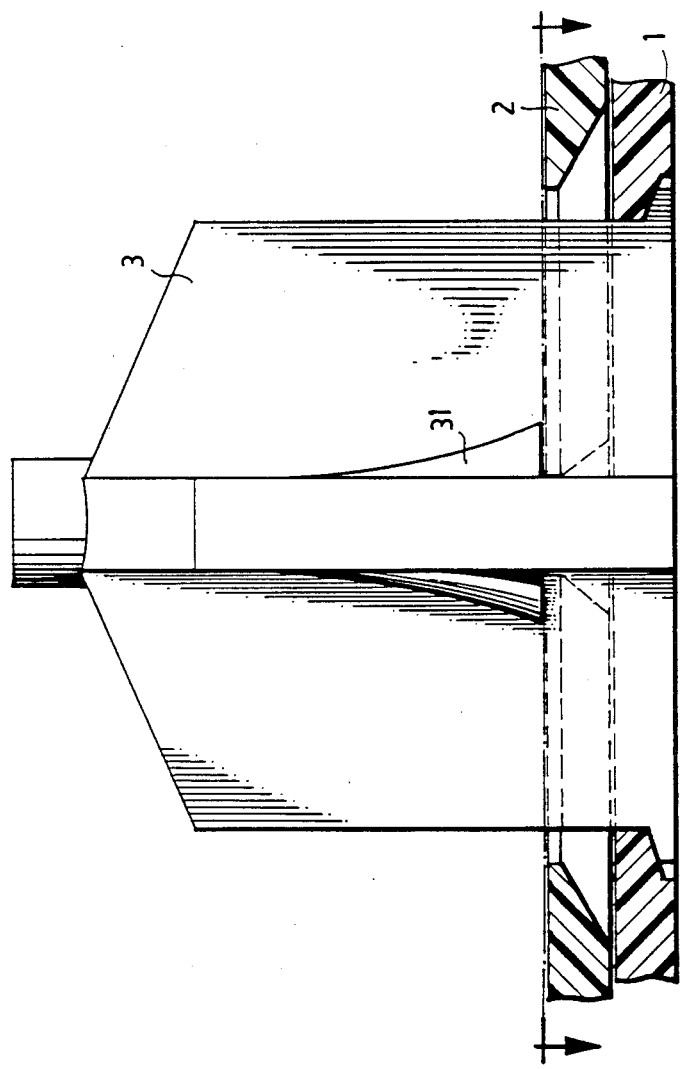
FIG. 5 is a partial side elevational view showing the combination of a top case housing of a cassette case and a bottom case housing of another cassette case with a bladed roller in accordance with the invention.

FIG. 5 illustrates the combination of a top case housing 1 of a cassette tape case with a bottom case housing 2 of another cassette tape by means of said bladed roller 3. It can be seen that the engaging element 31 is exactly above the surface of said bottom case housing 2, thus preventing the dislocation of the cassette tape cases.

With reference to FIG. 6, which illustrates a plurality of cassette tape cases combined to form a unit therefrom. Any of the detachable cassette tape may be withdrawn easily by opening the particular cassette case.

While the invention has been described, disclosed, illustrated and shown in terms of a preferred embodiment thereof, the scope of the invention should not be deemed to be limited by the preferred embodiment herein shown, illustrated, described or disclosed, such other embodiments or modifications may be suggested to those skilled in the art and falling within the scope and breadth of the invention as claimed herein.

I claim:
1. A cassette tape case comprising:
(a) a case body including a top case housing and a bottom case housing;
(b) a recess with a plurality of breakable ribs being formed on said bottom case housing;
(c) two bladed rollers detachably mounted on said bottom case housing, each bladed roller being provided with an engaging member spaced from the base thereof and protruded elements at the base thereof, wherein when said bladed roller is detached from the bottom case housing, the said protruded elements break away said ribs provided on said recess of said bottom case housing; and
(d) two apertures corresponding to said bladed rollers being provided on said top case housing, wherein said bladed rollers are detachable from said bottom case housing and insertable into said apertures of said top case housing.

* * * * *